United States Patent
Ogasawara et al.

(10) Patent No.: US 8,629,443 B2
(45) Date of Patent: Jan. 14, 2014

(54) ACTIVE MATRIX SUBSTRATE AND DISPLAY DEVICE

(75) Inventors: Isao Ogasawara, Osaka (JP); Masahiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/509,673

(22) PCT Filed: Aug. 9, 2010

(86) PCT No.: PCT/JP2010/063493
§ 371 (c)(1),
(2), (4) Date: May 14, 2012

(87) PCT Pub. No.: WO2011/067964
PCT Pub. Date: Jun. 9, 2011

(65) Prior Publication Data
US 2013/0043495 A1    Feb. 21, 2013

(30) Foreign Application Priority Data
Dec. 1, 2009   (JP) .................................. 2009-273526

(51) Int. Cl.
*H01L 29/04*    (2006.01)

(52) U.S. Cl.
USPC ............................................ 257/59; 349/45

(58) Field of Classification Search
USPC ..................... 257/59, 72; 349/43, 151, 152
See application file for complete search history.

(56) References Cited

U.S. PATENT DOCUMENTS

| | | | |
|---|---|---|---|
| 7,400,365 B2 * | 7/2008 | Gotoh et al. | ..................... 349/43 |
| 2003/0189542 A1 | 10/2003 | Lee et al. | |
| 2003/0222311 A1 | 12/2003 | Kim | |
| 2005/0263762 A1 | 12/2005 | Kim | |
| 2006/0022201 A1 | 2/2006 | Kim et al. | |
| 2006/0161693 A1 | 7/2006 | Lee et al. | |
| 2007/0164954 A1 | 7/2007 | Yang et al. | |

(Continued)

FOREIGN PATENT DOCUMENTS

| | | |
|---|---|---|
| JP | 2002-215105 A | 7/2002 |
| JP | 2005-522734 A | 7/2005 |

(Continued)

OTHER PUBLICATIONS

Official Communication issued in International Patent Application No. PCT/JP2010/063493, mailed on Sep. 14, 2010.

*Primary Examiner* — Brook Kebede
(74) *Attorney, Agent, or Firm* — Keating & Bennett, LLP (57) ABSTRACT

The present invention provides an active matrix substrate in which a peripheral can be narrowed or a gap between adjacent wirings increased to improve a yield. The present invention is an active matrix substrate in which a peripheral region is provided outside a display region. In the active matrix substrate, a first, a second, and a third transistor, a floating wiring, a switching wiring, a main wiring, and a branch wiring electrically connected with the main wiring are arranged in the peripheral region. The floating wiring and branch wiring each electrically connect the first and second transistors and comprise an intersecting portion intersecting with the switching wiring, with the third transistor being provided at the intersecting portion. A gate electrode of the third transistor includes the switching wiring, one of a source electrode and a drain electrode thereof includes the branch wiring, and the other of the source electrode and the drain electrode includes the floating wiring.

6 Claims, 7 Drawing Sheets

(56) References Cited

U.S. PATENT DOCUMENTS

| | | |
|---|---|---|
| 2008/0074567 A1 | 3/2008 | Jeon et al. |
| 2008/0203279 A1* | 8/2008 | Kobashi .................. 250/216 |
| 2008/0259237 A1 | 10/2008 | Kim |
| 2008/0266210 A1 | 10/2008 | Nonaka |
| 2008/0284698 A1 | 11/2008 | Lee et al. |
| 2009/0231504 A1 | 9/2009 | Toya et al. |
| 2010/0085335 A1 | 4/2010 | Kato |
| 2010/0141622 A1 | 6/2010 | Kim et al. |

FOREIGN PATENT DOCUMENTS

| | | |
|---|---|---|
| JP | 2005-527856 A | 9/2005 |
| JP | 2006-39524 A | 2/2006 |
| JP | 2007-193340 A | 8/2007 |
| JP | 2008-83703 A | 4/2008 |
| JP | 2008-292995 A | 12/2008 |
| JP | 2009-222839 A | 10/2009 |
| JP | 2010-86640 A | 4/2010 |
| JP | 2010-91765 A | 4/2010 |

* cited by examiner

ACTIVE MATRIX SUBSTRATE AND DISPLAY DEVICE

TECHNICAL FIELD

The present invention relates to an active matrix substrate and a display device. More specifically, the present invention relates to a monolithic-type active matrix substrate and display device.

BACKGROUND ART

The market for flat panel displays such as liquid crystal displays (LCD), plasma displays (PDP), inorganic electroluminescent (inorganic EL) displays, and organic electroluminescent (organic EL) displays has been expanding in the recent age of advanced information technology, and such displays are being actively developed.

Further reductions are being demanded with respect to the size and weight of portable electronic devices such as cellular phones and PDAs in which such flat panel displays are mounted. As a result, there is a trend towards reducing the size of the peripheral region of a display region, more specifically, a trend towards picture frame narrowing.

Furthermore, although in conventional display devices a configuration has been adopted in which a drive circuit and the like is mounted outside the display panel, in recent years, to reduce costs and obtain thinner devices, development is advancing with respect to display devices in which a full-monolithic circuit board is mounted in which peripheral circuits required for driving, such as a driver circuit, are provided on a substrate.

Liquid crystal display devices have been disclosed in which the circuit board configuration has been designed with the expectation that various effects will be exerted thereby (for example, see Patent Documents 1 to 3).

PRIOR ART REFERENCES

Patent Documents

Patent Document 1: JP 2008-83703A
Patent Document 2: JP 2007-193340A
Patent Document 3: JP 2005-527856A

SUMMARY OF THE INVENTION

Problems to be Solved by the Invention

Figure 11:
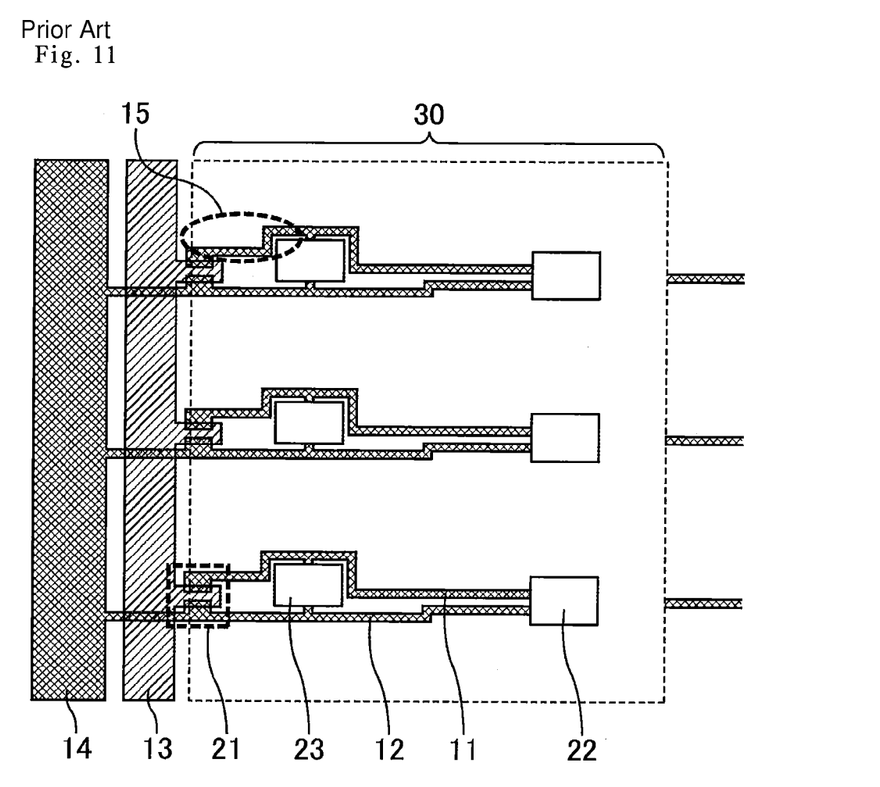
FIG. 11 is a schematic view that illustrates a drive circuit that is outside a display region in a conventional active matrix substrate.

In the liquid crystal display devices disclosed in the above described Patent Document 1 and Patent Document 2, a transistor T6 that is a circuit portion for resetting a floating wiring to a predetermined potential and wiring for an initialization signal (INT) are arranged outside a drive circuit. Therefore, an additional lead wire (for example, a lead wire 15 shown in FIG. 11) is provided when providing a structure that resets the floating wiring to a predetermined potential. There has thus been room for design improvement with respect to further reducing the size of a wiring region and increasing a gap between adjacent wirings to improve a yield. In particular, in the case of a transistor in which amorphous silicon (a-Si) is used, since the transistor size is large, there has been room for design improvement with respect to reducing layout limitations.

The present invention has been conceived in view of the present circumstances that are described above, and an object of the present invention is to provide an active matrix substrate that can narrow a picture frame and increase a gap between adjacent wirings to improve a yield.

Means for Solving the Problems

The inventors have conducted various studies with respect to active matrix substrates that can narrow a picture frame and increase a gap between adjacent wirings to improve a yield, and have focused attention on an arrangement of a switching wiring and a third transistor in a drive circuit. The inventors noticed that provision of an additional lead wire is required in the aforementioned liquid crystal display devices, and found that by adopting a configuration in which a floating wiring and a signal supply branch wiring each electrically connect two transistors within a drive circuit part and comprise an intersecting portion that intersects with the switching wiring, in which a third transistor is provided at the intersecting portion, provision of the above described additional lead wire is no longer required and it is possible to achieve picture frame narrowing or increase a gap between adjacent wirings to improve a yield. Having realized that this idea can beautifully solve the above problem, the inventors have arrived at the present invention.

More specifically, the present invention provides an active matrix substrate in which a peripheral region is provided outside a display region, wherein: in the active matrix substrate, a first, a second and a third transistor, a floating wiring, a switching wiring, a signal supply main wiring, and a signal supply branch wiring that is electrically connected with the signal supply main wiring are arranged in the peripheral region; the floating wiring and the signal supply branch wiring each electrically connect the first and the second transistor, and comprise an intersecting portion that intersects with the switching wiring, wherein the third transistor is provided at the intersecting portion; and in the third transistor, a gate electrode thereof includes the switching wiring, either one of a source electrode and a drain electrode thereof includes the signal supply branch wiring, and the other of the source electrode and the drain electrode includes the floating wiring.

The above term "floating wiring" refers to wiring that is capable of electrically connecting to a signal wiring only through a transistor. Floating wiring of this kind is not connected directly or through a conductor with the signal wiring, and depending on a switching action of the transistor, there are times when the floating wiring is electrically connected with the signal wiring and times when the floating wiring is not electrically connected with the signal wiring.

In this connection, the gate electrode of the third transistor includes the switching wiring. Normally, the gate electrode is not connected with the signal supply branch wiring. Either one of the source electrode and the drain electrode of the third transistor includes the signal supply branch wiring, and the other of the source electrode and the drain electrode includes the floating wiring.

By adopting this form, a configuration can be adopted in which either one of the source electrode and the drain electrode of the third transistor includes the floating wiring without providing the above described lead wire, and according to the active matrix substrate of the present invention, it is possible to achieve picture frame narrowing or increase a gap between adjacent wirings to improve a yield.

The configuration of the active matrix substrate of the present invention is not especially limited as long as it essentially includes such components.

Preferable embodiments of the active matrix substrate of the present invention are mentioned in more detail below.

As one preferable embodiment of the active matrix substrate of the present invention, a form may be mentioned in which the above described third transistor is provided on a main line of the switching wiring. According to this form, it is possible to decrease the area of an intersecting portion (also referred to as "crossing portion") of the wirings, narrow a wiring region (including a protruding portion in a case where a transistor is provided on a protruding portion of the wiring), and reduce variations in parasitic capacitance. In this connection, the above term "main line" refers to a place that is not a protruding portion of the wiring.

As one preferable embodiment of the active matrix substrate of the present invention, a form may be mentioned in which the above described switching wiring is wiring into which a pulse signal is input at fixed periods. According to this form, it is possible to reduce the size of a circuit portion for periodically resetting a potential of a floating wiring 11 to a predetermined potential and to increase a gap between adjacent wirings to improve a yield.

As one preferable embodiment of the active matrix substrate of the present invention, a form may be mentioned in which the above described floating wiring and/or the signal supply branch wiring comprises a detour structure at a boundary portion that, when a principal surface of the substrate is seen in a planar view, intersects with the switching wiring. According to this form, a yield of a display panel can be improved. More specifically, when wiring is formed by a photolithography process, since the photoresist is thicker at a step portion (a boundary part between a switching wiring portion and a portion where switching wiring is not formed when the principal surface of the substrate is seen in a planar view), there is a risk of a short circuit occurring between the floating wiring and the signal supply branch wiring due to residual resist and/or pattern failure. To prevent the occurrence of such a short circuit, at the step portion, it is preferable to adopt a form in which the floating wiring bends in the vicinity of the step portion so as to move away from the signal supply branch wiring and/or a form in which the signal supply branch wiring bends in the vicinity of the step portion so as to move away from the floating wiring.

Further, when a detour structure is not adopted, even in the case of the same load and resistance, it is possible to finely form the switching wiring and to reduce the resistance of the floating wiring and/or the signal supply branch wiring by an amount corresponding to the amount of wiring that is not required for a detour.

In this connection, the size of a transistor may be appropriately adjusted according to a generated gate signal and/or the properties of a semiconductor layer. For example, in the above described switching wiring, a notch portion and/or a protruding portion can be appropriately provided at an intersecting portion with the floating wiring and signal supply branch wiring as described above.

As one preferable embodiment of the active matrix substrate of the present invention, a form may be mentioned in which: in the above described switching wiring, a protruding portion is provided, and the third transistor is provided on the protruding portion, with the source electrode thereof being connected to a protruding portion of the signal supply branch wiring, and the drain electrode thereof being connected to a protruding portion of floating wiring; and a width of the respective protruding portions of the floating wiring and the signal supply branch wiring is one half or less a length of the protruding portion of the switching wiring. According to this form, even if the floating wiring and/or the signal supply branch wiring is formed in a misaligned manner relative to the switching wiring in a photolithography process, variations in parasitic capacitance can be reduced.

Preferably the width of the respective protruding portions of the floating wiring and the signal supply branch wiring is one third or less the length of the protruding portion of the switching wiring. In this connection, a preferable lower limit is, for example, one quarter or more.

Furthermore, preferably a length of the respective protruding portions of the floating wiring and the signal supply branch wiring is one half or more relative to the width of the protruding portion of the switching wiring, and more preferably, is two-thirds or more, and further preferably is three-quarters or more, and may be equal to or greater than the width of the protruding portion of the switching wiring. In this connection, a preferable upper limit is, for example, a multiple of three or less relative to the width of the protruding portion of the switching wiring.

The present invention also provides a display device including the active matrix substrate of the present invention.

Similarly to the display panel of the present invention, it is possible to obtain a display device in which a picture frame can be made narrower and a gap between adjacent wirings can be increased to improve a yield.

The aforementioned modes may be employed in appropriate combination as long as the combination is not beyond the spirit of the present invention.

EFFECTS OF INVENTION

According to the active matrix substrate of the present invention, it is possible to make a picture frame narrower and to increase a gap between adjacent wirings to improve a yield.

MODES FOR CARRYING OUT THE INVENTION

In the present specification, the term "picture frame" refers to a region (peripheral region of a display region) other than a display region in an active matrix substrate and a display device. Further, in a case where a portion that protrudes from a main line of wiring is provided, the wiring is assumed to include the protruding portion. Furthermore, one first transistor and one second transistor may be provided with respect to a single third transistor, or two first transistors and two second transistors may be provided with respect to a single third transistor.

The present invention will be mentioned in more detail in the following embodiments, but is not limited to these embodiments.

(Embodiment 1)

Figure 1:
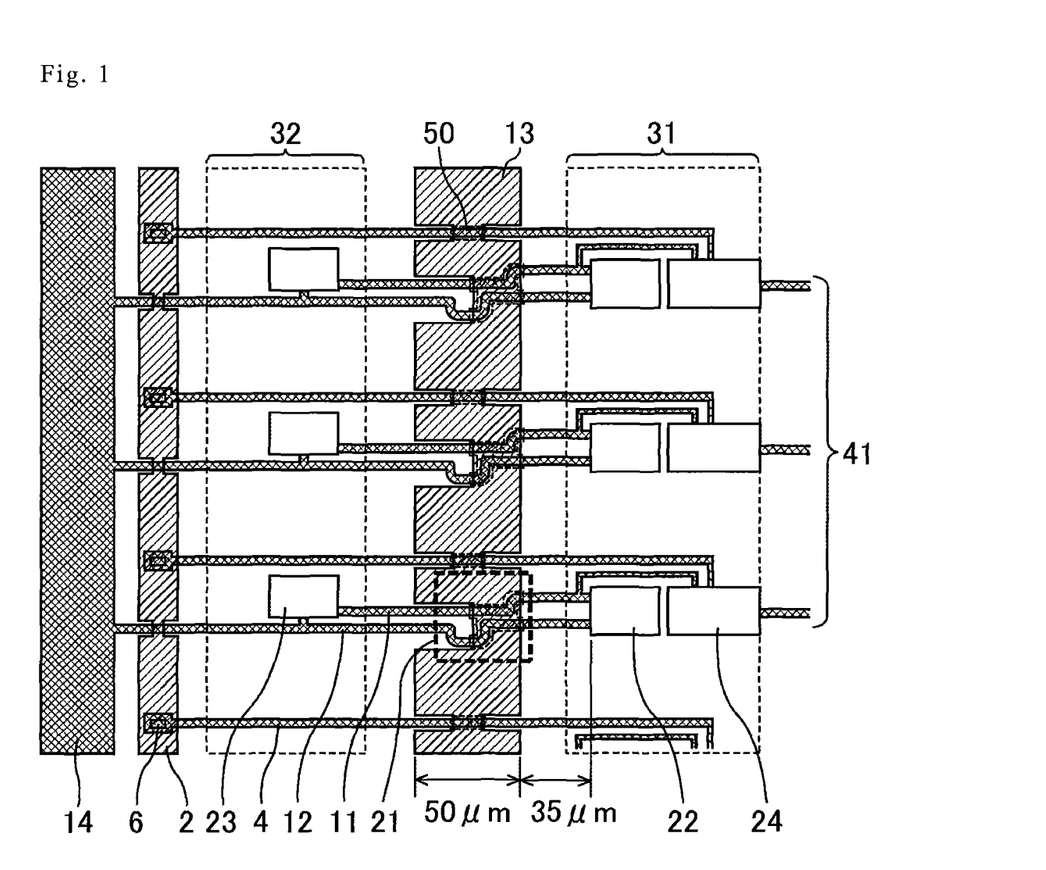
FIG. 1 is a schematic view that illustrates a drive circuit that is outside a display region in an active matrix substrate according to Embodiment 1.

FIG. 1 is a schematic view that illustrates a drive circuit that is outside a display region in an active matrix substrate according to Embodiment 1.

The active matrix substrate according to Embodiment 1 includes a display region and a drive circuit region that is outside the display region.

The drive circuit region includes at least one drive circuit. The drive circuit includes a first portion 31 and a second portion 32 that are shown in FIG. 1. The first portion 31 of the drive circuit includes a first transistor that is connected to a floating wiring 11 and a first transistor that is connected to a signal supply branch wiring 12. The second portion 32 of the first drive circuit includes a second transistor that is connected to the floating wiring 11 and a second transistor that is connected to the signal supply branch wiring 12. In other words, the floating wiring 11 is electrically connected to the first transistor that is connected to the floating wiring 11 inside the first portion 31, and to the second transistor that is connected to the floating wiring 11 inside the second portion 32. The signal supply branch wiring 12 is electrically connected to the first transistor that is connected to the signal supply branch wiring 12 inside the first portion 31, and to the second transistor that is connected to the signal supply branch wiring 12 inside the second portion 32. As shown in FIG. 1, a form may be adopted in which a first transistor 22 serves as both the first transistor that is connected to the floating wiring 11 inside the first portion 31 and the first transistor that is connected to the signal supply branch wiring 12 inside the first portion 31, and/or a second transistor 23 serves as both the second transistor that is connected to the floating wiring 11 inside the second portion 32 and the second transistor that is connected to the signal supply branch wiring 12 inside the second portion 32.

Figure 2:
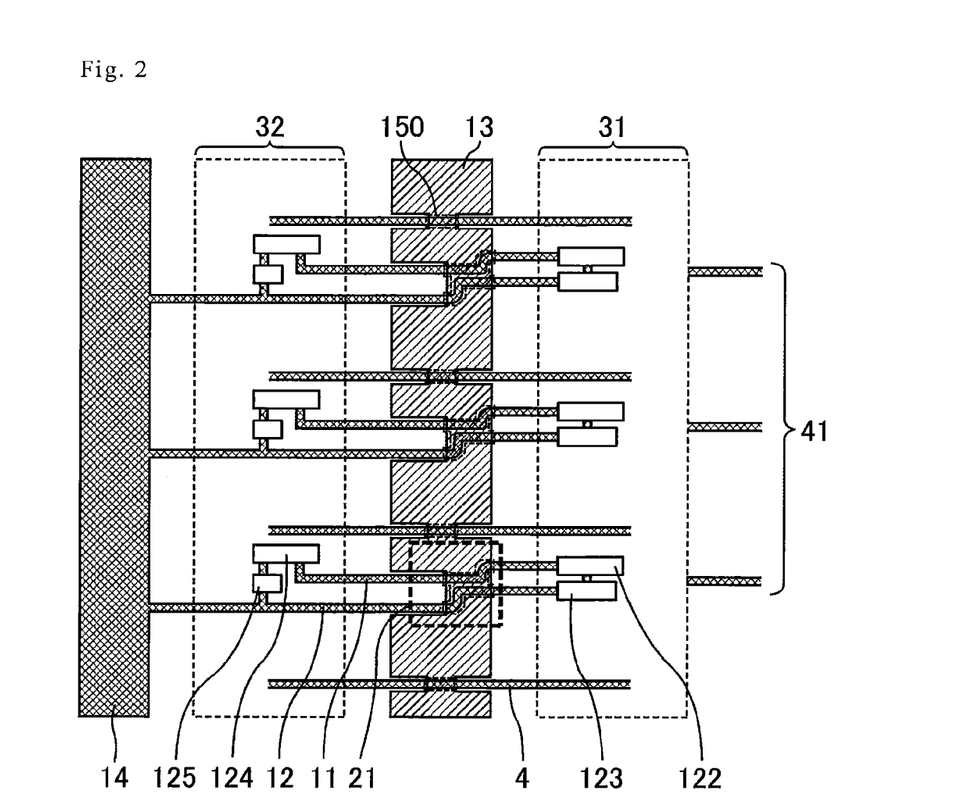
FIG. 2 is a schematic view that illustrates a drive circuit that is outside a display region in an active matrix substrate according to a modification example of Embodiment 1.

FIG. 2 is a schematic view that illustrates a drive circuit that is outside a display region in an active matrix substrate according to a modification example of Embodiment 1. The drive circuit illustrated in FIG. 2 includes a first transistor 122 that is connected to the floating wiring 11 inside the first portion 31, and a first transistor 123 that is connected to the signal supply branch wiring 12 inside the first portion 31. The drive circuit illustrated in FIG. 2 also includes a second transistor 124 that is connected to the floating wiring 11 inside the second portion 32, and a second transistor 125 that is connected to the signal supply branch wiring 12 inside the second portion 32. The remaining configuration of the modification example of Embodiment 1 is the same as the configuration of Embodiment 1 that is described above. In this connection, a clock main wiring 2 and a switching element 24 that are shown in FIG. 1 are omitted from FIG. 2. Further, a form may be adopted in which there is no wiring between the first transistor 122 and the second transistor 123, and/or there is no wiring between a fourth transistor 124 and a fifth transistor 125.

Further, a switching wiring 13 is interposedly arranged between the first portion 31 and the second portion 32, and intersects with the floating wiring 11 and the signal supply branch wiring 12. The drive circuit also includes a third transistor 21. The third transistor 21 is formed on the switching wiring 13. A gate electrode of the third transistor 21 includes the switching wiring 13, a source electrode thereof includes the signal supply branch wiring 12, and a drain electrode thereof includes the floating wiring 11.

A signal supply main wiring 14 is further provided in a drive circuit region outside the display region. The signal supply branch wiring 12 is connected with the signal supply main wiring 14. Note that although the floating wiring 11 is arranged on the upper side of the signal supply branch wiring 12 in FIG. 1, a form may also be adopted in which the floating wiring 11 is arranged on the lower side of the signal supply branch wiring 12.

According to Embodiment 1, the signal supply main wiring 14 is arranged on a side that is far from the display region (outside the second portion 32), and a signal that supplies an off potential to a transistor of the display region is input thereto. Further, a pulse signal is input to the switching wiring 13.

The drive circuit includes a plurality of transistors and a plurality of wirings that are connected to the plurality of transistors. In addition to the signal supply wirings (signal supply main wiring 14 and signal supply branch wiring 12), the wirings also include a wiring (floating wiring 11) that is in an electrically floating state in which the wiring is not connected to the signal supply wiring directly or through a conductor.

For example, the floating wiring 11 is a wiring that generates a gate on/off potential of a transistor (switching element 24) that is connected to a wiring that supplies a signal to a scanning line of the display region, and in order to stabilize the signal of the scanning line, the potential of the floating wiring 11 is periodically reset to a predetermined potential.

The gate electrode of the transistor (switching element 24) is electrically connected to the floating wiring 11. Further, one of a source electrode and a drain electrode of the transistor (switching element 24) is electrically connected with the clock main wiring 2, and the other of the source electrode and the drain electrode of the transistor is electrically connected with a scanning line of the display region. In FIG. 1, the clock main wiring 2 is connected to a clock branch wiring 4 via the clock main wiring 2 and a contact hole 6, and the clock branch wiring 4 is connected to one of the source electrode and the drain electrode of the transistor (switching element 24). A form in which the clock main wiring 2 is provided with a notch portion on both sides of an intersecting region with the signal supply branch wiring 12 is preferable.

To reset the potential as described above, for example, a configuration is used in which the wiring (signal supply main wiring 14) that supplies a gate off potential is connected via the third transistor 21 and the like, and the switching wiring 13 is provided therein.

According to the present embodiment, similarly to the signal supply main wiring 14, the switching wiring 13 supplies a signal that is received from outside the panel. In order to share flexible printed circuits (FPC) and the like for signal supply, wiring of the switching wiring 13 is performed by extending the switching wiring 13 in the same direction as (that is, in parallel with) the signal supply main wiring 14.

In this connection, the manner in which the switching wiring 13 supplies a signal is not limited to the above described means. For example, a circuit may be provided on a substrate.

The signal supply branch wiring 12 is used to connect the signal supply main wiring 14 and the third transistor 21. The signal supply branch wiring 12 is a wiring for supplying a gate off potential of the signal supply main wiring 14 to a transistor (switching element 24) inside the drive circuit via other transistors including the third transistor.

Preferably, the floating wiring 11, the signal supply branch wiring 12, the switching wiring 13 and the third transistor 21 are adjacently arranged so that an additional lead wire is not required.

Since the floating wiring 11 and the signal supply branch wiring 12 are formed in a plurality of steps in accordance with the number of scanning lines of the display region, the switching wiring 13 is wired so as to intersect with the floating wiring 11 and the signal supply branch wiring 12, and it is preferable that the third transistor 21 is arranged in the vicinity of the intersecting region.

In this connection, with respect to the terms "adjacently arranged" and "arranged in the vicinity of the intersecting region", it is sufficient that the intersecting region between the respective wirings and a semiconductor layer formation region of the transistor are arranged at positions that are sufficiently near to each other to achieve the respective effects of the present invention, and more specifically, it is preferable that all or a part of the intersecting region between the respective wirings is arranged so as to be superimposed on the semiconductor layer formation region of the transistor when the principal surface of the substrate is seen in a planar view.

That is, it is preferable that the switching wiring 13 and the third transistor 21 are arranged at an intervening position between the first portion 31 of the first drive circuit that includes the transistor 22 that is connected to the floating wiring 11, and the second portion 32 of the first drive circuit that includes the transistor 23 that is connected to the floating wiring 11.

Figure 3:
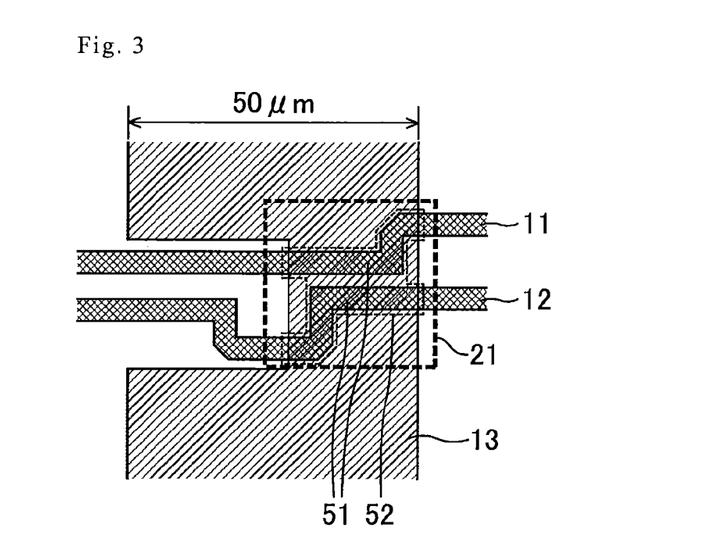
FIG. 3 is a partial enlarged view that illustrates the drive circuit that is outside the display region in the active matrix substrate according to Embodiment 1.

FIG. 3 is a partial enlarged view that illustrates the drive circuit that is outside the display region in the active matrix substrate according to Embodiment 1. A form in which the third transistor 21 is configured in the manner of the third transistor 21 shown in FIG. 3 is preferable.

Figure 12:
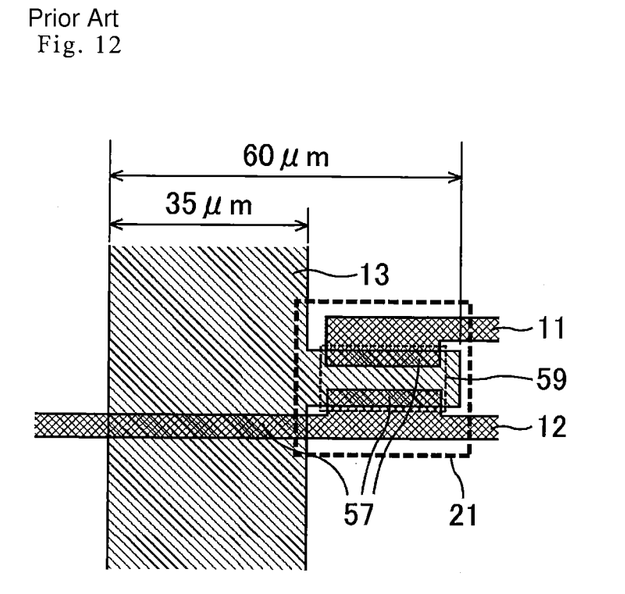
FIG. 12 is a partial enlarged view that illustrates a drive circuit that is outside a display region in a conventional active matrix substrate.

When a configuration according to the conventional example shown in FIG. 12 in which the switching wiring 13 and the third transistor 21 are formed at a separate place to an intersecting region between the main line of the switching wiring 13 and the floating wiring 11 and signal supply branch wiring 12 is applied to the present invention (configuration in which the switching wiring 13 and the third transistor 21 are arranged at an intervening position between the first portion 31 of the first drive circuit and the second portion 32 of the first drive circuit), the wiring intersection portion increases and the layout area also widens.

It is preferable to form the third transistor 21 on the main line of the switching wiring 13, that is, at a place that is not a protruding portion of the switching wiring 13, as in the present embodiment.

When a transistor according to the conventional example shown in FIG. 12 is applied to the present invention in a case where the switching wiring 13 is designed to have the same wiring resistance, the width of the main line of the switching wiring 13 according to the present invention is thicker (50 μm) in comparison with the width (35 μm) of the main line of the switching wiring 13 according to the conventional example. On the other hand, at least one of the following advantages (1) to (3) is obtained according to the present invention:

(1) An area of an intersecting region (crossing portion) is small and a load is light (30% lower than the aforementioned conventional example).

(2) A wiring region (50 μm) including a protruding portion of the transistor is narrow compared to a wiring region (60 μm) of the conventional example, and this is useful for realizing a narrower picture frame.

(3) Even if the floating wiring 11 and the signal supply branch wiring 12 are formed in a misaligned manner relative to the switching wiring 13 during a photolithography process, variations in parasitic capacitance are small, and fluctuations in an output waveform of a gate signal can be decreased.

Advantages of the present embodiment are that an additional lead wire is unnecessary, and constituent members for resetting the floating wiring 11 can be minimized.

In particular, when the third transistor 21 of the present embodiment is used, only a narrow region is required as the wiring region of the switching wiring 13 and therefore a wide space can be obtained between the switching wiring 13 and an adjacent transistor.

(Embodiment 2)

Figure 4:
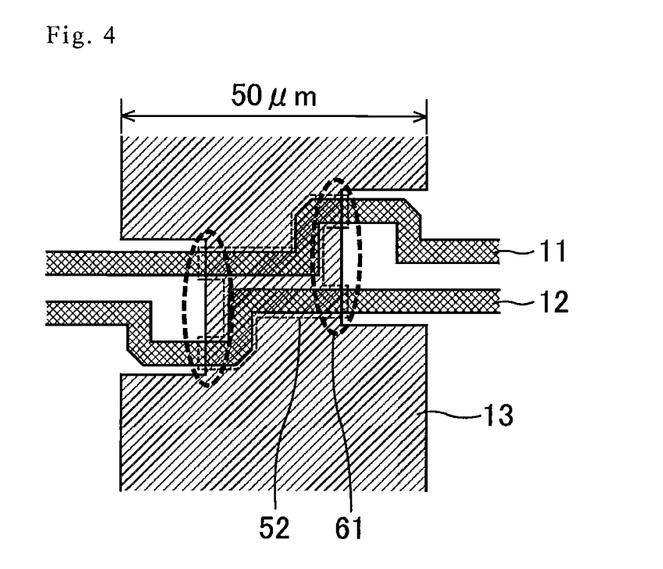
FIG. 4 is a partial enlarged view that illustrates a drive circuit that is outside a display region in an active matrix substrate according to Embodiment 2.

FIG. 4 is a partial enlarged view that illustrates a drive circuit that is outside a display region in an active matrix substrate according to Embodiment 2.

A notch portion when forming a transistor of the same size as in Embodiment 1 is not particularly limited.

For example, as shown in FIG. 4, a form in which both sides of the switching wiring 13 are notched to provide a notch portion on both sides of the intersecting region between the switching wiring 13, and the floating wiring 11 and signal supply branch wiring 12 is preferable. A capacitance of crossing portion can be reduced by providing the notch portions.

In this connection, in Embodiment 1 and Embodiment 2 the floating wiring 11 and the signal supply branch wiring 12 that intersect with the switching wiring 13 detour at a portion where the floating wiring 11 and the signal supply branch wiring 12 pass over the switching wiring 13, more specifically, when the principal surface of the substrate is seen in a planar view, at a boundary portion (a boundary portion 61 and the like) at which the floating wiring 11 and the signal supply branch wiring 12 intersect with the switching wiring 13. The reason this configuration is adopted is to prevent a short circuit occurring between the wirings and improve a yield.

According to the present embodiment, the switching wiring 13 is formed with a gate layer, a gate insulator is formed on the gate layer, and furthermore, a semiconductor layer and the floating wiring 11 and the signal supply branch wiring 12 are formed on the gate insulator. In a photolithography process, the photoresist is thicker at a step portion, and consequently residual resist is liable to be generated and pattern failures are liable to arise. It is preferable to adapt this detour structure in order to reduce the occurrence of short circuits between the floating wiring 11 and the signal supply branch wiring 12.

Further, when a form is adopted in which a notch portion is provided on both sides of the switching wiring 13, as in Embodiment 2, light shielding characteristics are enhanced around the transistor. More specifically, since it is possible to reduce a characteristics shift that is caused by backlight light entering from around the transistor and being incident on the semiconductor layer, this form is useful when using a high-intensity backlight.

FIGS. 5 to 8 are partial enlarged views that illustrate a drive circuit that is outside a display region in an active matrix substrate according to a modification example of Embodiment 2.

Figure 5:
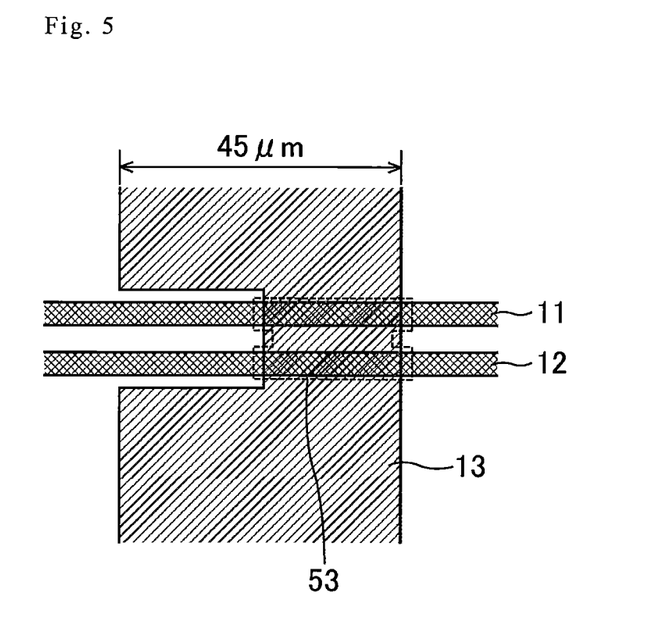
FIG. 5 is a partial enlarged view that illustrates a drive circuit that is outside a display region in an active matrix substrate according to a modification example of Embodiment 2.

As shown in the modification example of the Embodiment 2 illustrated in FIG. 5, when a detour structure is not adopted, even when the load and resistance are the same, it is possible to finely form the switching wiring 13, and to reduce the resistance of the floating wiring 11 and the signal supply branch wiring 12 by an amount corresponding to the amount of wiring that is not required for a detour, and this is a preferable form in these respects.

Figure 6:
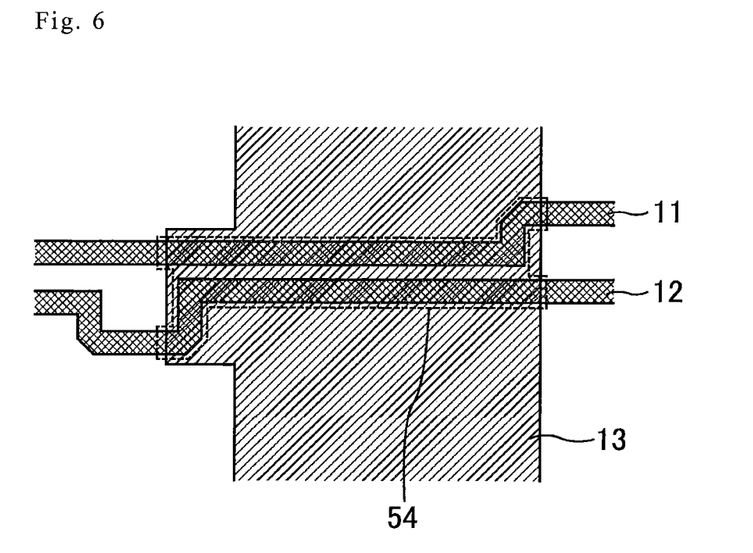
FIG. 6 is a partial enlarged view that illustrates a drive circuit that is outside a display region in an active matrix substrate according to a modification example of Embodiment 2.
Figure 7:
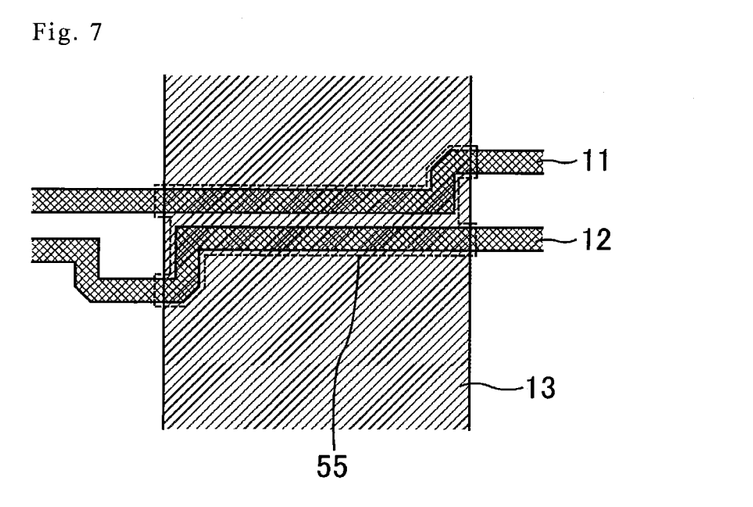
FIG. 7 is a partial enlarged view that illustrates a drive circuit that is outside a display region in an active matrix substrate according to a modification example of Embodiment 2.

In this connection, the size of the transistor changes depending on a generated gate signal and the properties of the semiconductor layer. Consequently, it is not necessarily the case that the switching wiring 13 must have a notch portion. It is also possible to adopt a configuration including a protruding portion as shown in FIG. 6, or a configuration that has neither a notch portion nor a protruding portion as shown in FIG. 7.

Figure 8:
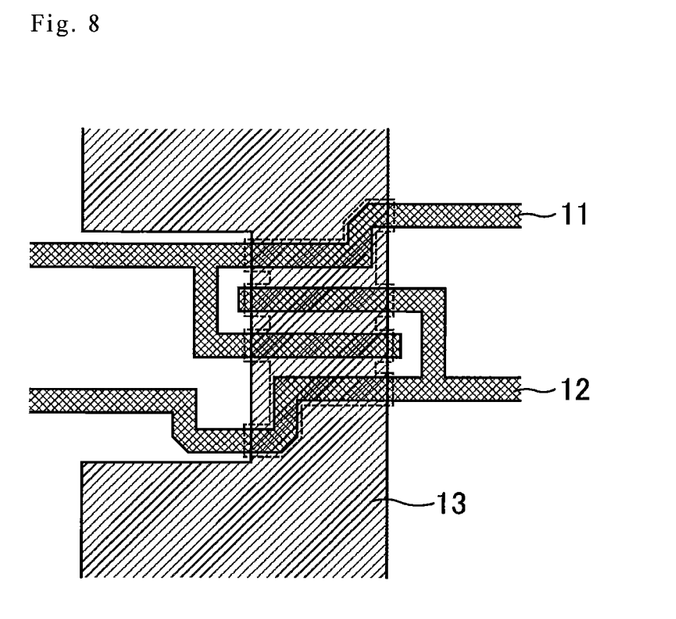
FIG. 8 is a partial enlarged view that illustrates a drive circuit that is outside a display region in an active matrix substrate according to a modification example of Embodiment 2.

In a form illustrated in FIG. 8, the third transistor has a comb tooth-shaped electrode. The above described effects of the present embodiment can also be exerted by such a form.
(Embodiment 3)

Figure 9:
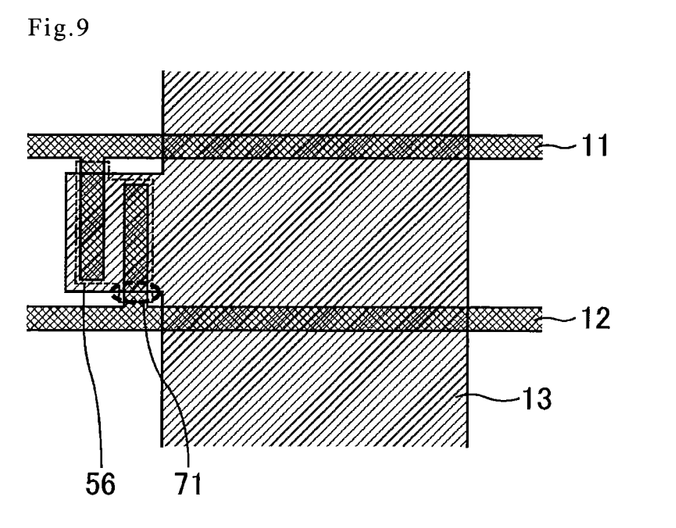
FIG. 9 is a partial enlarged view that illustrates a drive circuit that is outside a display region in an active matrix substrate according to Embodiment 3.

FIG. 9 is a partial enlarged view that illustrates a drive circuit that is outside a display region in an active matrix substrate according to Embodiment 3.

With respect to the third transistor 21, an active matrix substrate according to Embodiment 3 has a different configuration to Embodiment 1, Embodiment 2 and the modification examples thereof. A protruding portion is provided in the switching wiring 13, and the third transistor 21 is provided on the protruding portion. A source electrode of the third transistor 21 is connected to a protruding portion of the signal supply branch wiring 12, and a drain electrode of the third transistor 21 is connected to a protruding portion of the floating wiring 11. The width of the respective protruding portions of the floating wiring 11 and the signal supply branch wiring 12 is one half or less the length of the protruding portion of the switching wiring 13.

A fluctuation in parasitic capacitance is small in a case where the floating wiring 11 and the signal supply branch wiring 12 have been formed in a misaligned manner relative to the switching wiring 13 during a photolithography process, and the form is preferable in this respect. More specifically, according to the present embodiment, the width (also referred to as "pass-over width") of the above described protruding portions of the floating wiring 11 and the signal supply branch wiring 12 is small, and therefore a capacitance fluctuation is small even when an alignment deviation arises in the vertical direction in FIG. 9.

Figure 10:
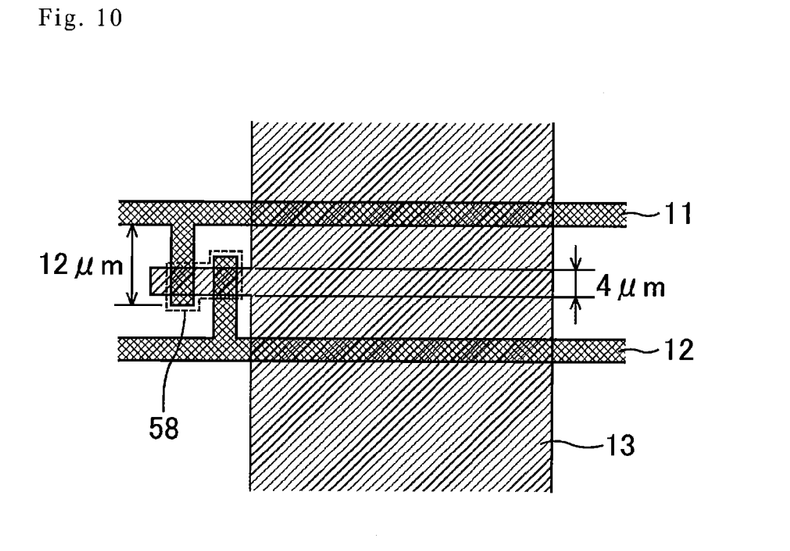
FIG. 10 is a partial enlarged view that illustrates a drive circuit that is outside a display region in an active matrix substrate according to a modification example of Embodiment 3.

FIG. 10 is a partial enlarged view that illustrates a drive circuit that is outside a display region in an active matrix substrate according to a modification example of Embodiment 3.

With respect to the floating wiring and signal supply branch wiring shown in FIG. 10, a ratio of the respective lengths (12 μm) of the protruding portions thereof to the width (4 μm) of the protruding portion of the switching wiring is 3:1. According to this form also, when the floating wiring 11 and the signal supply branch wiring 12 are formed in a misaligned manner relative to the switching wiring 13, variations in parasitic capacitance can be reduced, and this is therefore a preferable form.

In addition, the shape of the third transistor may be another shape. For example, one of the source electrode and the drain electrode may be a channel shape or a U shape, or may be a shape that is combined with a comb tooth-shaped electrode.

Note that, according to the present embodiment also, an additional lead wire for resetting the potential of the floating wiring 11 is not required, and only the minimum circuit configuration is required.

The aforementioned modes of the embodiments may be employed in appropriate combination as long as the combination is not beyond the spirit of the present invention.

The present application claims priority to Patent Application No. 2009-273526 filed in Japan on Dec. 1, 2009 under the Paris Convention and provisions of national law in a designated State, the entire contents of which are hereby incorporated by reference.

REFERENCE SIGNS LIST

2: Clock main wiring
4: Clock branch wiring
6: Contact hole
11: Floating wiring
12: Signal supply branch wiring
13: Switching wiring
14: Signal supply main wiring
15: Lead wire
21: Third transistor
22: First transistor
23: Second transistor
24: Switching element
31: First portion of drive circuit
32: Second portion of drive circuit
41: Wiring connected with scanning line of display region
51, 57: Intersecting portion between floating wiring and signal supply branch wiring, and the switching wiring 50, 52, 53, 54, 55, 56, 58, 59, 150: Semiconductor layer formation region
61: Boundary portion at which floating wiring and signal supply branch wiring and the switching wiring intersect
71: Pass-over width
122: First transistor that is connected to floating wiring
123: First transistor that is connected to signal supply branch wiring
124: Second transistor that is connected to floating wiring
125: Second transistor that is connected to signal supply branch wiring

The invention claimed is:
1. An active matrix substrate in which a peripheral region is provided outside a display region, wherein:
in the active matrix substrate, a first, a second and a third transistor, a floating wiring, a switching wiring, a main wiring, and a branch wiring that is electrically connected with the main wiring are arranged in the peripheral region;
the floating wiring and the branch wiring each electrically connect the first and the second transistor, and comprise an intersecting portion that intersects with the switching wiring, wherein the third transistor is provided at the intersecting portion; and in the third transistor, a gate electrode thereof comprises the switching wiring, either one of a source electrode and a drain electrode thereof comprises the branch wiring, and the other of the source electrode and the drain electrode comprises the floating wiring.

2. The active matrix substrate according to claim 1, wherein the third transistor is provided on a main line of the switching wiring.

3. The active matrix substrate according to claim 1, wherein the switching wiring is wiring into which a pulse signal is input at fixed periods.

4. The active matrix substrate according to claim 1, wherein:

the floating wiring and/or the branch wiring comprises a detour structure at a boundary portion that, when a principal surface of the substrate is seen in a planar view, intersects with the switching wiring.

5. The active matrix substrate according to claim 1, wherein:

in the switching wiring, a protruding portion is provided, and the third transistor is provided on the protruding portion, with the source electrode thereof being connected to a protruding portion of the branch wiring, and the drain electrode thereof being connected to a protruding portion of the floating wiring; and a width of the respective protruding portions of the floating wiring and the branch wiring is one half or less a length of the protruding portion of the switching wiring.

6. A display device comprising an active matrix substrate according to claim 1.

* * * * *